US007613459B2

(12) United States Patent
Woo et al.

(10) Patent No.: US 7,613,459 B2
(45) Date of Patent: Nov. 3, 2009

(54) CALL PROCESSING METHOD AND APPARATUS IN A PRIVATE COMMUNICATION SYSTEM

(75) Inventors: Moo-Yeon Woo, Seongnam-si (KR); Gui-Jung Lee, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 241 days.

(21) Appl. No.: 11/216,036

(22) Filed: Sep. 1, 2005

(65) Prior Publication Data
US 2006/0046729 A1    Mar. 2, 2006

(30) Foreign Application Priority Data
Sep. 2, 2004    (KR) .................. 10-2004-0070080

(51) Int. Cl.
*H04W 40/00* (2006.01)
(52) U.S. Cl. .................. 455/445; 455/453; 455/435.1; 455/417; 455/422.1
(58) Field of Classification Search .................. 455/445, 455/453, 435.1, 417, 422.1, 406, 410
See application file for complete search history.

(56) References Cited

U.S. PATENT DOCUMENTS

| | | | |
|---|---|---|---|
| 5,751,706 A * | 5/1998 | Land et al. .................. 370/352 |
| 6,223,039 B1 * | 4/2001 | Holm et al. .............. 455/435.2 |
| 6,292,553 B1 * | 9/2001 | Fellingham et al. .... 379/221.02 |
| 6,324,280 B2 * | 11/2001 | Dunn et al. .................. 379/230 |
| 6,665,279 B1 * | 12/2003 | Kwak et al. .................. 370/328 |
| 2002/0022497 A1 | 2/2002 | Kim et al. |
| 2002/0027497 A1 | 3/2002 | Sumada et al. |
| 2003/0129971 A1 * | 7/2003 | Gopikanth .................. 455/414 |
| 2004/0160939 A1 | 8/2004 | Kim |
| 2004/0203782 A1 * | 10/2004 | Peng et al. .................. 455/436 |
| 2004/0204097 A1 * | 10/2004 | Scheinert et al. ............ 455/561 |
| 2006/0019664 A1 * | 1/2006 | Nelakanti et al. ........... 455/436 |

FOREIGN PATENT DOCUMENTS

| | | |
|---|---|---|
| CN | 1325226 | 12/2001 |
| CN | 1423507 | 6/2003 |
| CN | 1520204 | 8/2004 |
| JP | 2000-013823 | 1/2000 |

(Continued)

OTHER PUBLICATIONS

Australian Office Action for Australian Patent Application No. 2005203244 issued on Nov. 16, 2006.

(Continued)

*Primary Examiner*—Joseph H Feild
*Assistant Examiner*—Huy D Nguyen
(74) *Attorney, Agent, or Firm*—Robert E. Bushnell, Esq.

(57) ABSTRACT

A call processing method and apparatus in a private wireless communication system or WPBX, by which when the WPBX service subscriber originates a PLMN voice call in the private wireless communication service zone without inputting the preset identification number, the call is forwarded to the PSTN and/or wired/wireless Internet linked to the WPBX instead of being sent to the PLMN so that the WPBX service subscriber can be provided with a more convenient communication service at a cheaper price when he/she wants to be provided with the PLMN service.

15 Claims, 5 Drawing Sheets

FOREIGN PATENT DOCUMENTS

| | | |
|---|---|---|
| JP | 2000013823 | 1/2000 |
| JP | 2003348628 | 12/2003 |
| JP | 2004-236340 | 8/2004 |
| JP | 2004248292 | 9/2004 |
| JP | 2005525713 | 8/2005 |
| WO | 03017712 | 2/2003 |
| WO | 2004/040938 | 5/2004 |

OTHER PUBLICATIONS

Japanese Office Action for corresponding Japanese Patent Application No. 2005-244879 issued on Apr. 1, 2008.

Chinese Office Action for corresponding Chinese Patent Application No. 200510091649.X issued on Apr. 4, 2008 (with English translation).

Japanese Office action issued on Aug. 5, 2008 in the corresponding Japanese Patent Application No. 2005-244879.

Japanese Office Action dated Nov. 25, 2008 corresponding to Japanese Patent Application No. 2005-244879.

Office Action from the Chinese Patent Office issued in Applicant's corresponding Chinese Patent Application No. 200510091649.X dated May 8, 2009 and Request for Entry of the Accompanying Office Action.

* cited by examiner

FIG. 3

| FIELD | LENGTH(bits) | REMARK |
|---|---|---|
| MOB_TERM | 1 | |
| SLOT_CYCLE_INDEX | 3 | SLOT CYCLE INDEX |
| MOB_P_REV | 8 | PROTOCOL CHANGE OF TERMINAL |
| SCM | 8 | STATION CLASS MARK |
| REQUEST_MODE | 3 | REQUEST MODE CODE |
| SPECIAL_SERVICE | 1 | SPECIAL SERVICE INDICATOR |
| SERVICE_OPTION | 0 or 16 | SERVICE OPTION |
| PM | 1 | PRIVATE MODE INDICATOR |
| DIGIT_MODE | 1 | DIGIT MODE INDICATOR |
| NUMBER_TYPE | 0 or 3 | NUMBER TYPE FOR DIGIT MODE |
| NUMBER_PLAN | 0 or 4 | NUMBERING PLAN |
| MORE_FIELDS | 1 | CONNECTED LINE NUMBER INDICATOR |
| NUM_FIELDS | 8 | CONNECTED LINE NUMBER |

FIG. 4

| IDENTIFICATION NO | SERVICE CONTENTS |
|---|---|
| *88 | VOICE MAIL |
| *71 | CALL FORWARDING |
| *710 | CALL FORWARDING CANCEL |
| *72 | AUTOMATIC LINK |
| *720 | AUTOMATIC LINK CANCEL |
| *40 | CALL WAITING |
| *400 | CALL WAITING CANCEL |

CALL PROCESSING METHOD AND APPARATUS IN A PRIVATE COMMUNICATION SYSTEM

CLAIM OF PRIORITY

This application makes reference to, incorporates the same herein, and claims all benefits accruing under 35 U.S.C. §119 from an application for CALL PROCESSING METHOD AND APPARATUS IN A PRIVATE COMMUNICATION SYSTEM earlier filed in the Korean Intellectual Property Office on 2 Sep. 2004 and there duly assigned Serial No. 2004-70080.

BACKGROUND OF THE INVENTION

1. Field of the Invention

The present invention relates to call processing method and apparatus in a private wireless communication system, more particularly, by which when a subscriber of the private wireless communication system originates a Public Land Mobile Network (PLMN) call, the call is automatically forwarded to a Public Switched Telephone Network (PSTN) or an Internet linked to the private wireless communication system so that a user can be provided with a convenient communication service at a cheaper price.

2. Description of the Related Art

As a solution to provide a free voice and data communication service in an in-building atmosphere, code division multiple access radio frequency (CDMA-RF) technology is combined with a private communication system such as a wired/wireless private branch exchange (PBX).

Herein the private communication is not limited to the in-building atmosphere but shall be construed to include the communication atmosphere in a specific area (e.g., a campus and a barrack).

Since the Public Land Mobile Network and the wired/wireless private communication system are linked to each other, the combined system allows a user to have a communication even if the user moves to any place in a building. When the user moves out of a service zone of the private communication system, this combined system supports a hand-off function with respect to the Public Land Mobile Network. Various additional services are provided, by which the user is notified of an emergent information via a short message service, and can search in-building information from the outside in case of the construction of an intranet.

SUMMARY OF THE INVENTION

It is, therefore, an object of the present invention to provide call processing method and apparatus in a private wireless communication system, more particularly, by which when a subscriber of the private wireless communication system originates a Public Land Mobile Network call, the call is automatically forwarded to a Public Switched Telephone Network or an Internet linked to the private wireless communication system so that a user can be provided with a convenient communication service at a cheaper price.

It is another object of the invention to provide call processing method and apparatus in a private wireless communication system, by which when a terminal subscribed to a private wireless communication service originates a Public Land Mobile Network voice or data call in a private wireless communication service zone without inputting a preset identification number, the call is forwarded to a Public Switched Telephone Network or Internet linked to the private wireless communication system instead of being sent to a base station controller (BSC) of the Public Land Mobile Network so that a private wireless communication service subscriber can be provided with a more convenient communication service at a cheaper price.

According to an aspect of the invention for realizing the above objects, there is provided a private wireless communication system comprising: a call processor circuit for routing an origination signal to a Public Switched Telephone Network or Internet linked to the private wireless communication system based upon the type of the origination signal upon receiving the origination signal via a network from a mobile terminal located in a service zone of the private wireless communication system.

Preferably, the call processor circuit includes: a network status manager for inspecting link status of the Public Switched Telephone Network and Internet and storing Public Switched Telephone Network and Internet link status information; a call processor for forwarding the origination signal to the Public Switched Telephone Network or Internet based upon the origination signal type; and a router for routing the origination signal to the call processor based upon the origination signal type.

Preferably, the router analyzes whether or not the origination signal contains a Public Land Mobile Network service identification number therein, when the origination signal type received from the mobile terminal is a voice call origination signal, and if the Public Land Mobile Network service identification number is contained, routes the voice call origination signal to a Public Land Mobile Network.

Preferably, the router routes the voice call signal to the Public Land Mobile Network if the origination signal does not contain the Public Land Mobile Network service identification number and the Public Switched Telephone Network link status information stored in the network status manager is not normal.

Preferably, the router inspects whether or not the Internet link status information stored in the network status manager is normal, when the origination signal type received from the mobile terminal is a data call origination signal, and if the Internet link status information is not normal, routes the data call origination signal to a Public Land Mobile Network.

Preferably, the network status manager includes: a Public Switched Telephone Network relay linked to the Public Switched Telephone Network to inspect the status of the Public Switched Telephone Network and to interface a voice call origination signal from the mobile terminal to the Public Switched Telephone Network; an Internet relay linked to the Internet to inspect the status of the Internet and to interface the data call origination signal from the mobile terminal to the Internet; and a PSTN/Internet status manager for storing and managing Public Switched Telephone Network status information and Internet status information inspected by the Public Switched Telephone Network and Internet relays.

Preferably, the router stores detailed information of subscribed mobile terminals, and includes a verifier for verifying an accessed mobile terminal.

According to another aspect of the invention for realizing the above objects, there is provided a call processing apparatus in a private wireless communication system linked to a Public Switched Telephone Network, an Internet and a Public Land Mobile Network, respectively, the call processing apparatus comprising: a network status manager for inspecting link status of the Public Switched Telephone Network and Internet and storing Public Switched Telephone Network and Internet link status information; a call processor for forwarding an origination signal receiving from a mobile terminal to the Public Switched Telephone Network or Internet based upon the type of the origination signal; and a router for routing the origination signal received from the mobile terminal to the call processor or the Public Land Mobile Network based upon the type of the origination signal.

According to further another aspect of the invention for realizing the above objects, there is provided a call processing method in a private wireless communication system, the method comprising the steps of: if an origination signal is received from a mobile terminal, judging whether the received origination signal is a voice call origination signal or a data call origination signal; and forwarding the origination signal to a linked Public Switched Telephone Network or Internet based upon the type of the received origination signal.

The call processing method may further comprise the steps of: if the received origination signal is a voice call origination signal, verifying the mobile terminal to determine whether or not the mobile terminal is subscribed to the private wireless communication system, and judging whether the received voice call origination signal contains a preset Public Land Mobile Network service identification number; if the voice call origination signal does not contain the Public Land Mobile Network service identification number, judging whether or not current Public Switched Telephone Network link status is normal; and if the Public Switched Telephone Network link status is normal, forwarding the voice call origination signal to the Public Switched Telephone Network.

The call processing method may further comprise the step of: if the voice call origination signal contains the Public Land Mobile Network service identification number, the Public Switched Telephone Network link status is not normal, and the mobile terminal is not verified, routing the received voice call origination signal to the Public Land Mobile Network.

The call processing method may further comprise the steps of: if the received origination signal is a data call origination signal, verifying the mobile terminal; after the verification, judging whether or not the link status of the Internet is normal; and if the Internet link status is normal, forwarding the received data call origination signal to the Internet.

The call processing method may further comprise the step of: if the Internet link status is not normal and the mobile terminal is not verified, routing the received data call origination signal to the Public Land Mobile Network.

According to other aspect of the invention for realizing the above objects, there is provided a call processing method in a private wireless communication system, the method comprising the steps of: if a voice call connection request message is received from a mobile terminal, judging whether or not the received voice call connection request message contains a preset Public Land Mobile Network service identification number; if the voice call connection request message does not contain the preset Public Land Mobile Network service identification number, inspecting whether or not the link status of a linked Public Switched Telephone Network is normal; and if the Public Switched Telephone Network link status is normal, forwarding the received voice call connection request message to the Public Switched Telephone Network.

According to further another aspect of the invention for realizing the above objects, there is provided a call processing method in a private wireless communication system, the method comprising the steps of: if a data call request message is received from a mobile terminal, executing a subscription verification to the mobile terminal; if the mobile terminal is verified, inspecting whether or not the link status of a linked Internet is normal; and if the Internet link status is normal, forwarding the received data call connection request message to the Internet.

According to yet another aspect of the invention for realizing the above objects, there is provided a call processing method in a private wireless communication system, the method comprising the steps of: if a call connection request message is received from a mobile terminal, judging whether or not the received call connection request message contains a preset identification information for a Public Land Mobile Network service; if the call connection request message does not contain the Public Land Mobile Network service identification information, judging whether the received call connection request message is a voice call connection request message or a data call connection request message; verifying whether or not the mobile terminal is subscribed to the private wireless communication system; and forwarding the call connection request signal to a linked Public Switched Telephone Network or Internet based upon the type of the call connection request message.

The call processing method may further comprise the step of: if the call connection request message contains the preset Public Land Mobile Network service identification information, routing the call connection request message to the Public Land Mobile Network regardless of the type of the call connection request message.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 3 is a table illustrating a format of an origination message which is transmitted from a mobile terminal at the initial call connection;

FIG. 4 illustrates examples of identification numbers used in a Public Land Mobile Network.

DETAILED DESCRIPTION OF THE PREFERRED EMBODIMENTS

Figure 1:
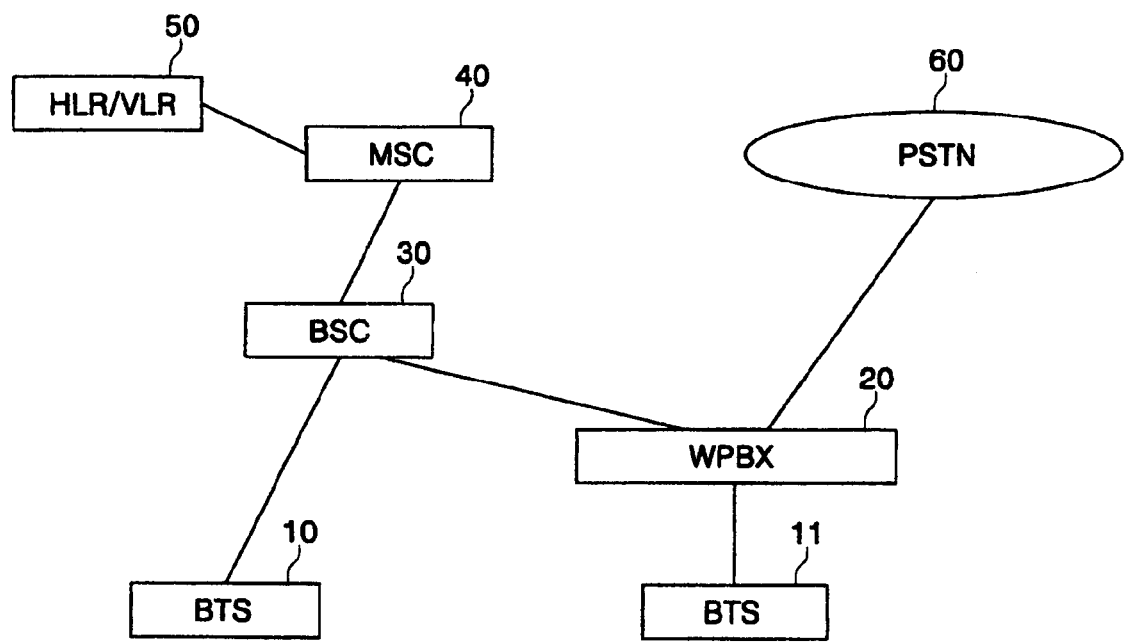
FIG. 1 schematically illustrates the network link between a Public Land Mobile Network and a Wireless Private Branch eXchange (WPBX)

FIG. 1 schematically illustrates the network link between a Public Land Mobile Network and a private wireless communication system such as wireless PBX (WPBX).

A mobile terminal (not shown) located in a service zone of WPBX 20, if not subscribed to WPBX 20, is provided with a wireless communication service from WPBX 20, but with a general Public Land Mobile Network service only. WPBX 20 judges whether a caller located in its service zone is subscribed thereto or not, and if the caller is not subscribed thereto, routes a call from the caller to a public network base station controller 30 so that the caller can be serviced via a Public Land Mobile Network (not shown).

If a terminal is subscribed to WPBX 20, it can be provided with not only the general Public Land Mobile Network service but also a wireless private communication service in the WPBX service zone. However, a terminal subscribed to the WPBX 20 is required to transmit a specifically preset identification number to the WPBX 20 via a Base Station Transceiver (BTS) 11 in order to be serviced by the WPBX 20.

When the terminal subscribed to the WPBX 20 located in the service zone of the WPBX 20 attempts to call the Public Land Mobile Network by calling without inputting the preset identification number, the WPBX 20 as shown in FIG. 1 sends the call to a public land mobile network base station controller (BSC) 30 so that the terminal can link to the Public Land Mobile Network. However, the Public Land Mobile Network has a disadvantage in that a user feels the Public Land Mobile Network is expensive.

Of course, a terminal subscribed to the wireless private communication service can input a specifically preset identification number to access to the Public Switched Telephone Network 60 via the WPBX 20 in order to have a low cost communication in the private wireless communication service zone. That is, the identification number inputted by the user is used as a reference for discriminating a communication via the WPBX 20 from that of the Public Land Mobile Network. However, this requires the user to remember the specific identification number and inconveniently input the specific identification number in person. In addition, when the user attempts to call by using a send button only through a caller identification function of a mobile terminal or a telephone directory stored in the mobile terminal, it is difficult to input the preset identification number.

In FIG. 1, the reference numeral 10 represents a public land mobile network BTS 10, the reference numeral 40 represents a Mobile Switching Center (MSC) 40, and the reference numeral 50 represents a Home Location Register/Visitor Location Register (HLR/VLR) 50.

Figure 2:
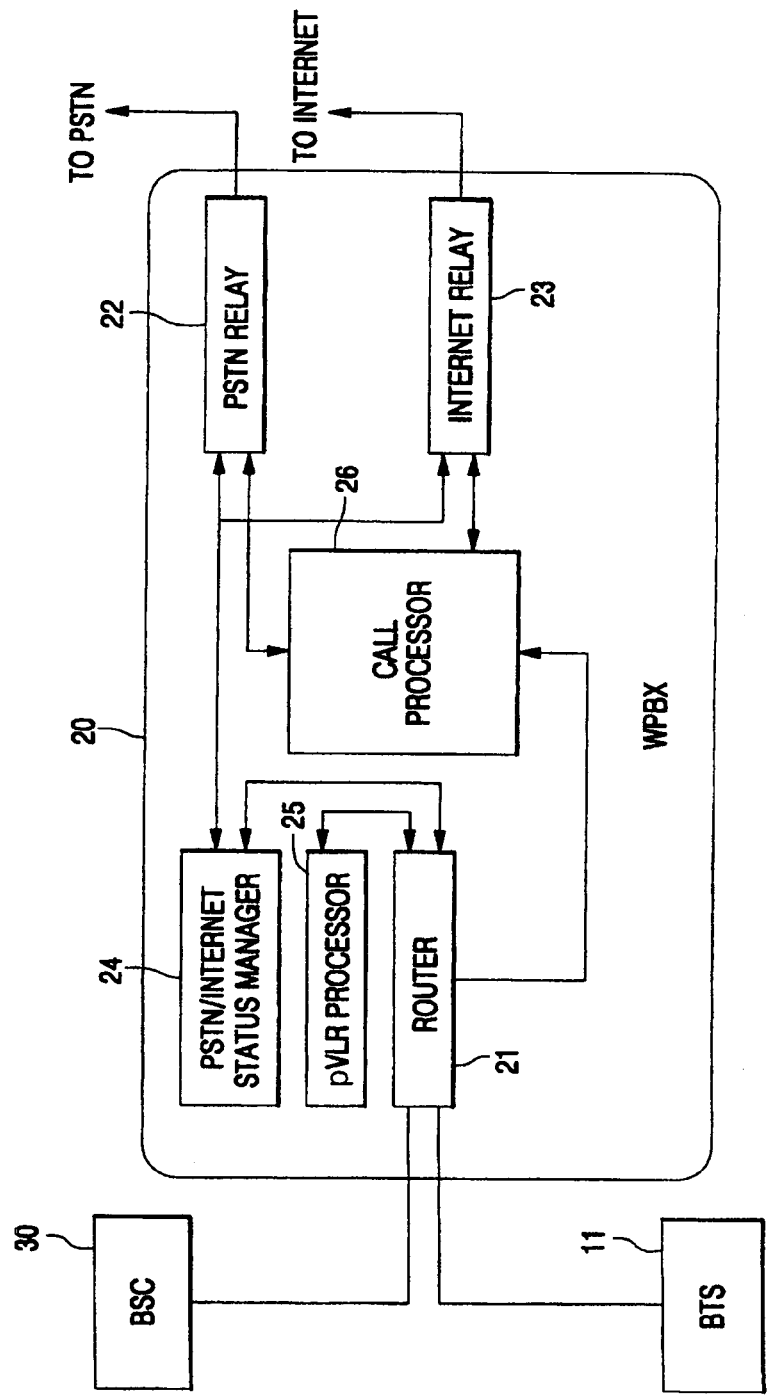
FIG. 2 is a block diagram of a call processing apparatus in a WPBX according to the invention.

FIG. 2 is a block diagram of a call processing apparatus in a WPBX according to the invention.

As shown in FIG. 2, WPBX 20 includes a router 21, a Public switched telephone network relay 22, an Internet relay 23, a PSTN/Internet status manager 24, a private Visitor Location Register (pVLR) processor 25 and a call processor 26.

The public switched telephone network relay 22 is connected to a Public Switched Telephone Network, and functions to inspect physical lines such as E1/T1 connected to the Public Switched Telephone Network and their link status as well as to send status information to the PSTN/Internet status manager 24.

The Internet relay 23 is connected to the Internet, and functions to inspect any physical lines connected to the Internet and their link status as well as to send status information to the PSTN/Internet status manager 24.

The PSTN/Internet status manager 24 stores and manages the Public Switched Telephone Network and Internet link status information sent from the public switched telephone network relay 22 and the Internet relay 23 while inspecting whether or not it is possible to provide a Public Switched Telephone Network or wireless Internet service by using the WPBX 20. Herein, the Public Switched Telephone Network and Internet link status information is used by the router 21 as a reference in the judgment for routing a (voice/data) call.

The pVLR 25 stores data of WPBX subscribers, and when one of the WPBX subscribers attempts to call, verifies the subscriber. The verification information of the WPBX subscriber is used by the router 21 as a reference in the judgment for call routing.

The router 21 is combined with the BTS 11 and the BSC 30. Upon initially receiving a call connection request message from a mobile terminal (not shown), the router 21 analyzes the received message to route a voice or data call to the call processor 26 for a WPBX service or to the BSC 30 for a Public Land Mobile Network service.

That is, if the received call connection request message from the mobile terminal requests the WPBX service, the router 21 sends the call connection request message to the call processor 26 in the WPBX 20. If the received call connection request message requests the Public Land Mobile Network service, the router 21 routes the call connection request message to the public land mobile network BSC 30.

The call processor 26 functions to execute call processing according to preset wireless access regulations so that the mobile terminal can be provided with a call service. In case of a call for the WPBX service, the call processor 26 sends the call to the Public Switched Telephone Network or the Internet via the public switched telephone network relay 22 or the Internet relay 23. If the call received from the mobile terminal is a voice call, the call processor 26 transmits the voice call to the Public Switched Telephone Network via the public switched telephone network relay 22. If the call is a data call, the call processor 26 transmits the data call to the Internet via the Internet relay 23.

A call processing apparatus in the private wireless communication system or WPBX of the invention of the above structure will be described in detail as follows:

Referring to FIG. 2, an initial origination message from the mobile terminal (not shown) is sent to the router 21 of the WPBX 20 via the BTS 11.

The router 21 analyzes the origination message, which is sent from the mobile terminal via the BTS 11, to judge whether a corresponding call is a voice or data call. The format of the origination message transmitted from the mobile terminal is as shown in FIG. 3. That is, FIG. 3 is a table illustrating a formation of an origination message which is transmitted from a mobile terminal at the initial call connection. The origination message format shown in FIG. 3 is defined in 3rd Generation Partnership Project (3GPP) IS 2000 standards. IS-2000 is the second generation of IS-95. Interim Standard 95 (IS-95), is the first CDMA-based digital cellular standard now being supplanted by IS-2000.

The data and voice calls in the table will be described for example as follows:

According to FIGS. 2 and 3, the router 21 analyzes the "SERVICE OPTION" field of the origination message to classify whether the call from the mobile terminal is a voice or data call. The above operation classifies the call as a voice call, for example, if the "SERVICE OPTION" field of the origination message is "3;" but as a data call, for example, if the "SERVICE OPTION" field of the origination message is "22." It is to be understood that the data and voice calls can be classified according to various values defined in the above standards other than these values, i.e., "3" and "22."

In addition, although it was described that the data call is classified from the voice call based upon the "SERVICE OPTION' field of the origination message, it is to be understood that an additional message format can be defined to classify the calls based upon a field in the defined format.

Where the corresponding call is a voice call, the operation is as follows:

If the received call origination message does not have a present identification number, a conventional WPBX does not execute any call processing but sends the voice call to a Public Land Mobile Network BSC.

However, even if the call origination message received in the router 21 of the WPBX 20 does not have a preset identification number, the WPBX 20 of the invention is designed to forward the corresponding call to the Public Switched Telephone Network network so that the call can be processed.

Herein following conditions are preset to the router 21.

First, it is judged whether the origination message received from the mobile terminal contains an identification number unique for the Public Land Mobile Network. If the identification number is unique for the Public Land Mobile Network, the mobile terminal is not serviced in combination with the Public Switched Telephone Network via the WPBX 20, and thus the WPBX 20 sends the received call message to the public land mobile network BSC 30 so that the mobile terminal can be serviced from the Public Land Mobile Network.

Since the identification number unique for the Public Land Mobile Network may be different according to Public Land Mobile Network providers, it is necessary for the WPBX 20 to previously have information about these different identification numbers. For example, KTF (a mobile communication service provider in Korea) uses identification numbers unique for the Public Land Mobile Network as in FIG. 4.

As shown in FIG. 4, an identification number ***88 attached to the call connection message is used for requesting a voice mail service. In addition, ***71 is an identification number for setting call forwarding, ***710 is an identification number for canceling call forwarding, ***72 is an identification number for setting an automatic link, ***720 is an identification number for canceling the automatic link, ***40 is an identification number for setting call waiting, and ***400 is an identification number for canceling call waiting.

Therefore, upon receiving the call connection request message via the BTS 11 from the mobile terminal, the router 21 judges whether or not any of the above identification numbers are attached to the message, and if any identification number is attached to the message, the router 21 forwards the corresponding call to the public land mobile network BSC 30 in order to provide a call service to the mobile terminal.

Second, it is judged whether or not the mobile terminal is subscribed to the WPBX 20. In this case, the router 21 cooperates with the pVLR processor 25 to execute a verification to the mobile terminal in order to judge whether or not the originating mobile terminal is subscribed to the WPBX 20.

If the corresponding mobile terminal fails the verification, because it is not subscribed to the WPBX 20, subscriber services are not provided to the mobile terminal. Therefore, the call origination message from the mobile terminal is forwarded to the public land mobile network BSC 30 so that the mobile terminal can be call-serviced via the Public Land Mobile Network.

Third, the router 21 inspects the status of the public switched telephone network relay 22. The Public Land Mobile Network can service the mobile terminal, if the call connection request message from the mobile terminal does not have an identification number used in the WPBX. Where a low cost service via the Public Switched Telephone Network is impossible because of the malfunction of the public switched telephone network relay 22, the corresponding call is routed to the public land mobile network BSC 30 in order to provide the mobile terminal with the Public Land Mobile Network service so that the WPBX subscriber can have communication without inconvenience. The public switched telephone network relay 22 may inspect the status of the Public Switched Telephone Network (e.g., line or link status) periodically. Alternatively, the public switched telephone network relay 22 can automatically detect any hardware-based event such as line or link breakage to automatically send Public Switched Telephone Network status information to the PSTN/Internet status manager 24.

The router 21 inspects the above three conditions. If it is judged that the mobile terminal can be provided with the Public Switched Telephone Network service via the WPBX 20, the call connection request message from the mobile terminal is sent to the call processor 26.

While it has been described that the above three conditions are inspected and it is judged that the Public Switched Telephone Network service be provided only if all of the three conditions are satisfied, it is to be understood that the terminal verification can be determined according to selective conditions settled between users and providers. For example, if the Public Switched Telephone Network call forwarding service is provided free of charge, the terminal verification is not defined as a required condition.

The call processor 26 transmits the call connection request message from the mobile terminal, which is routed by the router 21, to the Public Switched Telephone Network via the public switched telephone network relay 22. The call processing operation of the Public Switched Telephone Network is substantially the same as a typical call processing operation and therefore will not be described further in detail.

As a result, upon receiving a call connection request message from the mobile terminal via the BTS 11, the router 21 of the WPBX 20 judges through the inspection of the above three conditions whether the corresponding call is to be processed by the WPBX 20 and then forwarded to the Public Switched Telephone Network or to be processed by the public land mobile network BSC 30.

That is, the router 21 of the WPBX 20 judges whether the call connection request message received from the mobile terminal via the BTS 11 contains an public land mobile network identification number, and if the identification number exists, routes the corresponding call request message to the public land mobile network BSC 30.

On the contrary, if the identification number does not exist in the call connection request message received from the mobile terminal, the WPBX 20 executes verification to determine whether the corresponding mobile terminal is subscribed to the WPBX 20. That is, the router 21 inspects whether or not mobile terminal information contained in the received call connection request message is identical with any one of mobile terminal informations stored in the pVLR processor 25.

The verification can be selectively performed according to the setting by a network operator, and examples of the information stored in the pVLR processor 25 may include at least one selected from the group consisting of, but not limited to, a terminal number, an extension number, ESN information and terminal status (location) information.

If the corresponding mobile terminal fails the verification because it is not subscribed to the WPBX 20, the router 21 routes the corresponding call to the public land mobile network BSC 30. If the mobile terminal passes the verification, the WPBX 20 routes the corresponding call to the call processor 26 of the WPBX 20.

After the verification of the mobile terminal, the router 21 inspects the PSTN/Internet status manager 24 to judge whether or not the current link status with respect to the Public Switched Telephone Network is normal, that is, the Public Switched Telephone Network physical line is normal. If the link status is normal, the router 21 routes the corresponding call to the call processor 26. If the link status is abnormal, the router 21 routes the corresponding call to the Public Land Mobile Network BSC 30.

That is to say, if the terminal passes the verification and the current Public Switched Telephone Network link status is normal, the call processor 26 transmits a voice call connection request message from the mobile terminal, which is routed by the router 21, to the Public Switched Telephone Network via the public switched telephone network relay 22 so that the mobile terminal can be voice-serviced via the Public Switched Telephone Network.

In the meantime, the router 21 analyzes those values attached to the SERVICE OPTION field, shown in FIG. 3, of the origination message received via the BTS 11 from the mobile terminal. If the corresponding call is judged a data call connection request message, a data call routing operation is performed as will be described hereinafter.

First, when the mobile terminal attempts to originate a data call, an origination message or call connection request message is received by the router 21 of the WPBX 20 via the BTS 11.

The router 21 judges whether the origination message satisfies preset conditions. If the origination message satisfies the preset conditions, the router 21 uses resources of the WPBX 20 to link to the Internet in order to provide a low cost wireless Internet service to the user.

Those conditions preset in the router 21 are as follows:

First, since the data call does not contain any identification number used in the Public Land Mobile Network, it is inspected whether or not the data call-originating mobile terminal is subscribed to the WPBX 20.

If the originating mobile terminal is not subscribed to the WPBX 20, the router 21 routes the data call of the mobile terminal to the public land mobile network BSC 30 so that the mobile terminal can be data-serviced via the Public Land Mobile Network.

Second, the status of the Internet relay 23 is inspected. That is, the router 21 inspects the PSTN/Internet status manager 24 to determine the current link status with respect to the Internet. If the Internet link of the WPBX 20 is abnormal and thus the wireless Internet service cannot be provided, the router 21 sends the data call request message from the mobile terminal to the public land mobile network BSC 30. In this way, even though the mobile terminal cannot be provided with the low cost service, it can be data-serviced via the Public Land Mobile Network so that the WPBX subscriber does not have inconvenience in using the wireless Internet service.

Through the above process, if it is judged that the Internet data service can be provided via the WPBX 20, the router 21 routes the origination message received from the mobile terminal to the call processor 26 of the WPBX 20.

In response to the routed call connection request message of the mobile terminal, the call processor 26 accesses to a server (not shown) via the wireless Internet in order to execute a data service through preset call processing procedures. The server may be a WPBX Internet server connected via a PDSN (Packet Data Serving Node (not shown)) of the WPBX or a contents server that is operated by a general service provider.

Summarizing the data call service operation to the mobile terminal located within the service zone of the WPBX 20, the router 21 first receives a call connection request message from the mobile terminal via the BTS 11. Then, the router 21 analyzes the received call connection request message to judge whether a corresponding call is a data or voice call. If the received call connection request message is for a data service, the router 21 judges whether a corresponding mobile terminal is subscribed to the WPBX 20. That is, upon receiving the call connection request message, the router 21 extracts a mobile terminal information from the corresponding message, and compares the extracted mobile terminal information with mobile terminal informations stored in the pVLR 25 to execute a verification to the corresponding mobile terminal.

If the corresponding mobile terminal fails the verification since it is not subscribed to the WPBX 20, the router 21 routes the corresponding call to the public land mobile network BSC 30 so that the mobile terminal can be data-serviced via the Public Land Mobile Network.

If the mobile terminal passes the verification, the router 21 inspects the PSTN/Internet status manager 24 in order to determine whether or not the link status with respect to the current wireless Internet is normal.

If the link status with respect to the wireless Internet is normal, the router 21 sends the received data call connection request message to the call processor 26, which in turn transmits the corresponding call to the Internet via the Internet relay 23. This as a result allows the mobile terminal to access an Internet contents server via the Internet so that a user can be provided with a desired data communication service.

As an alternate embodiment of the invention, for a situation that the user positively wants voice and data services via the Public Land Mobile Network, a button or icon for requesting a corresponding service may be provided on the mobile terminal or in a menu window on a display of the mobile terminal. In this way, when the user presses the button or clicks the icon, corresponding service type information can be transmitted from the mobile terminal as attached to an origination message or a specifically preset message.

Then, the router 21 of the WPBX 20 analyzes the service type information attached to the origination message to determine whether or not a corresponding information is attached thereto. If the corresponding information is attached, the router 21 routes all voice and data calls to the public land mobile network BSC 30.

Alternatively, instead of installing the additional button in the mobile terminal, the mobile terminal and the router 21 of the WPBX may be preset with the same identification number so that a call connection request message attached with the identification number can be routed unconditionally to the public land mobile network BSC 30.

A call processing method of the invention corresponding to the operation of the call processing apparatus in the WPBX of the invention as described above will be described in a stepwise fashion with reference to the accompanying drawing.

Figure 5:
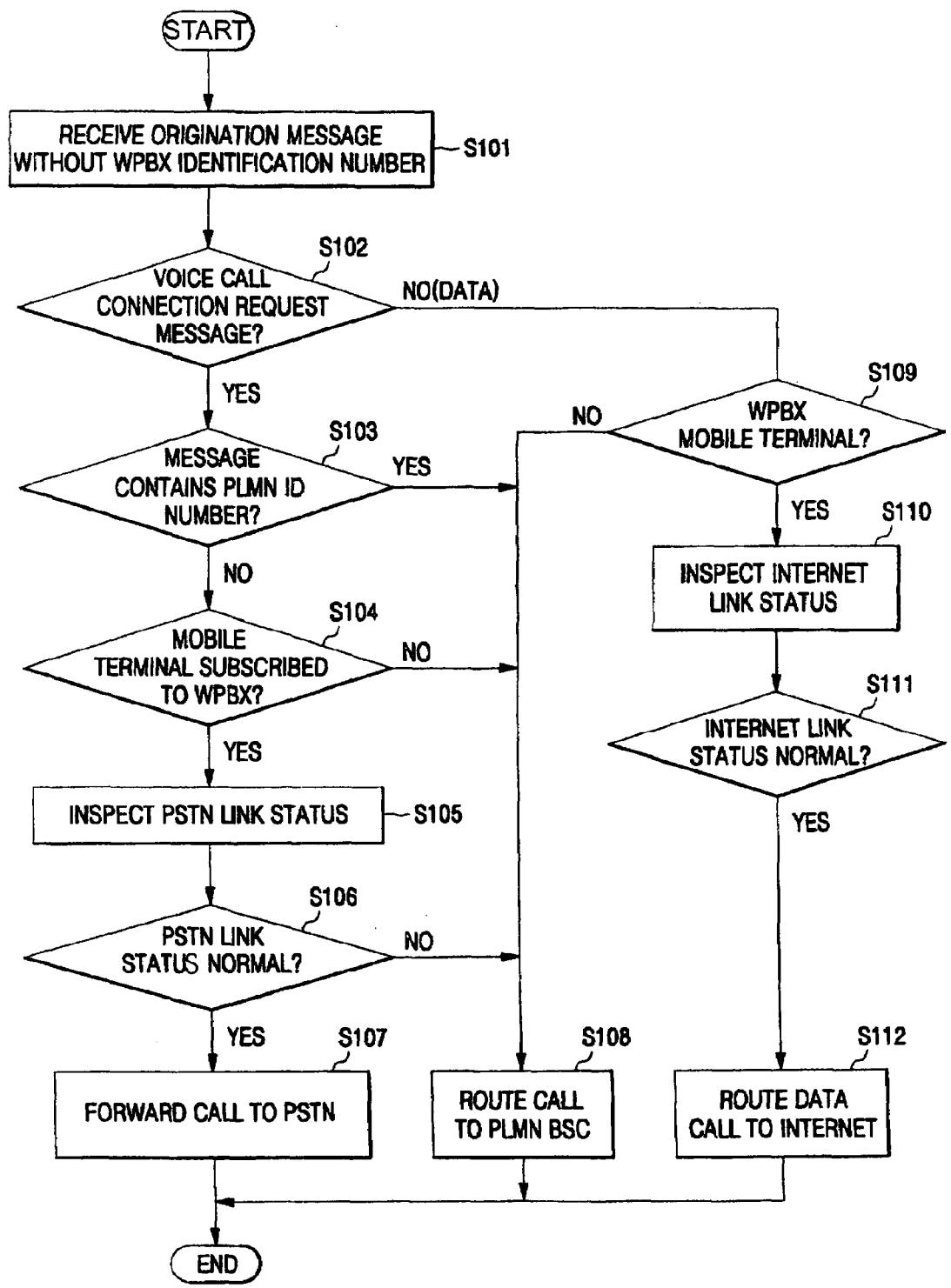
FIG. 5 is a flowchart of the call processing method in the WPBX of the invention.

FIG. 5 is a flowchart of the call processing method in the WPBX of the invention.

First, the WPBX receives a call connection request message or an "Origination Message" as shown in FIG. 3, which does not contain any WPBX identification number, via the BTS from a mobile terminal in S101.

The WPBX analyzes the received "Origination Message" to judge whether the origination message is a data call connection request message or a voice call connection request message in S102.

If the received origination message is the voice call connection request message, the WPBX inspects whether or not the origination message contains a Public Land Mobile Network service identification number in S103.

If the origination message does not contain any Public Land Mobile Network service identification number, the WPBX executes a verification in order to determine whether or not the mobile terminal is subscribed to the WPBX in S104.

If the mobile terminal is subscribed to the WPBX, the WPBX inspects the Public Switched Telephone Network link status in S105 to determine whether or not the Public Switched Telephone Network link status is normal in S106 in order to forward the voice call to the Public Switched Telephone Network.

If the Public Switched Telephone Network link status is normal, the WPBX routes the received origination message to the Public Switched Telephone Network in S107 so that the mobile terminal can be provided with a voice service via the Public Switched Telephone Network.

However, if the received origination message contains the Public Land Mobile Network service identification number in S103 or the mobile terminal fails the verification since it is not subscribed to the WPBX in S104 or the current Public Switched Telephone Network link status is not normal owing to the error of a Public Switched Telephone Network link or a physical line in S106, the WPBX routes the received voice call connection request message to the public land mobile network BSC so that the mobile terminal can be provided with the voice communication service via the Public Land Mobile Network in S108.

If the origination message received in S102 is a data call connection request message, the WPBX executes a verification to determine whether or not the mobile terminal is subscribed to the WPBX in S109.

If it is verified that the mobile terminal is subscribed to the WPBX, the WPBX inspects the wired/wireless Internet link status in S110, and thus judges whether or not the wired/wireless Internet link status is normal in S111.

If the wired/wireless Internet link is normal, the WPBX routes the data call to the wired/wireless Internet in S112.

In the meantime, if it is verified that the mobile terminal is not subscribed to the WPBX in S109 or the Internet link status is not normal in S111, the WPBX routes the data call connection request message to the Public Land Mobile Network BSC so that the mobile terminal can be provided with the data service via the Public Land Mobile Network in S108.

According to the call processing method and apparatus in the private wireless communication system or WPBX of the invention, when the WPBX service subscriber originates a Public Land Mobile Network voice call in the private wireless communication service zone without inputting the preset identification number, the call is forwarded to the Public Switched Telephone Network and/or wired/wireless Internet linked to the WPBX instead of being sent to the Public Land Mobile Network so that the WPBX service subscriber can be provided with a more convenient communication service at a cheaper price.

As a result, the call processing method and apparatus in the private wireless communication system or WPBX of the invention forwards a Public Land Mobile Network voice call, which is originated by the WPBX service subscriber in the private wireless communication service zone without inputting the preset identification number, to the Public Switched Telephone Network and/or wired/wireless Internet linked to the WPBX instead of being sent to the Public Land Mobile Network so that the WPBX service subscriber can be provided with a more convenient communication service at a cheaper price.

In the call processing method and apparatus in the private wireless communication system or WPBX of the invention, when the WPBX service subscriber originates a Public Land Mobile Network voice call in the private wireless communication service zone without inputting the preset identification number, the call is forwarded to the Public Switched Telephone Network and/or wired/wireless Internet linked to the WPBX instead of being sent to the Public Land Mobile Network so that the WPBX service subscriber can be provided with a more convenient communication service at a cheaper price when he/she wants to be provided with the Public Land Mobile Network service.

Further, since the subscriber need not remember or input the preset identification number when attempting to access to the Public Switched Telephone Network or the wired/wireless Internet via the WPBX, the invention can ensure convenience in use.

Moreover, the subscriber can be serviced by conveniently using a cheap WPBX through selection of a send button or menu icon without inputting the identification number into the mobile terminal having a caller identification function.

What is claimed is:

1. A private wireless communication system comprising a call processor circuit for routing an origination signal to a Public Switched Telephone Network (PSTN) or an Internet linked to the private wireless communication system based upon an origination signal type of the origination signal that is received via a network from a mobile terminal located in a service zone of the private wireless communication system, wherein the call processor circuit comprises:
    a network status manager for inspecting a link status of the Public Switched Telephone Network and Internet and storing Public Switched Telephone Network link status information and Internet link status information;
    a call processor for forwarding the origination signal to the Public Switched Telephone Network or Internet based upon the origination signal type; and
    a router for determining the origination signal type and routing the origination signal to the call processor based upon the determination, said router inspecting whether or not the Internet link status information stored in the network status manager is normal, when a determination is made that the origination signal type received from the mobile terminal is a data call origination signal, and if the Internet link status information is considered to be not normal, routing the data call origination signal to a Public Land Mobile Network.

2. The private wireless communication system according to claim 1, wherein the router analyzes whether the origination signal contains a Public Land Mobile Network (PLMN) service identification number therein when a determination establishes that the origination signal type received from the mobile terminal is a voice call origination signal, and when the Public Land Mobile Network service identification number is contained, routes the voice call origination signal to a Public Land Mobile Network.

3. The private wireless communication system according to claim 2, wherein the router routes the voice call signal to the Public Land Mobile Network, when the origination signal does not contain the Public Land Mobile Network service identification number and the Public Switched Telephone Network link status information stored in the network status manager is considered to be not normal.

4. A call processing apparatus in a private wireless communication system linked to a Public Switched Telephone Network (PSTN), an Internet and a Public Land Mobile Network (PLMN), the call processing apparatus comprising:
    a network status manager for inspecting a link status of the Public Switched Telephone Network and a link status of the Internet and storing Public Switched Telephone Network link status information and Internet link status information;
    a call processor for forwarding an origination signal, received from a mobile terminal, to one of the Public Switched Telephone Network and the Internet based upon characteristics of the origination signal; and
    a router for routing the origination signal received from the mobile terminal to one of the call processor and the Public Land Mobile Network based upon the characteristics of the origination signal, said router inspecting whether or not the Internet link status information stored in the network status manager is normal, when the characteristics of the origination signal received from the mobile terminal are indicative of a data call origination signal, and when the Internet link status information is considered to be not normal, routing the data call origination signal to the Public Land Mobile Network.

5. The call processing apparatus according to claim 4, wherein the router analyzes whether or not the origination signal contains a Public Land Mobile Network service identification number therein, when the characteristics of the origination signal received from the mobile terminal indicate that the origination signal is a voice call origination signal, and when the Public Land Mobile Network service identification number is contained therein, routes the voice call origination signal to the Public Land Mobile Network.

6. The call processing apparatus according to claim 5, wherein the router routes the voice call signal to the Public Land Mobile Network when the origination signal does not contain the Public Land Mobile Network service identification number and the Public Switched Telephone Network link status information stored in the network status manager is considered to be normal.

7. The call processing apparatus according to claim 4, wherein the network status manager includes:
  a public switched telephone network relay linked to the Public Switched Telephone Network to inspect the status of the Public Switched Telephone Network and to interface a voice call origination signal from the mobile terminal to the Public Switched Telephone Network;
  an Internet relay linked to the Internet to inspect the status of the Internet and to interface the data call origination signal from the mobile terminal to the Internet; and
  a PSTN/Internet status manager for storing and managing the Public Switched Telephone Network link status information and the Internet link status information inspected by the Public Switched Telephone Network and Internet relays.

8. The call processing apparatus according to claim 4, wherein the router stores detailed information of subscribed mobile terminals, and includes a verifier for verifying an accessing mobile terminal.

9. A call processing method in a private wireless communication system, the method comprising steps of:
  when an origination signal is received from a mobile terminal, judging whether the received origination signal is one of a voice call origination signal and a data call origination signal;
  forwarding the origination signal to a linked Public Switched Telephone Network (PSTN) when the received origination signal is determined to be a voice call origination signal;
  forwarding the origination signal to a linked Internet when the received origination signal is determined to be a data call origination signal;
  verifying the mobile terminal to determine whether the mobile terminal is subscribed to the private wireless communication system, when the received origination signal is a voice call origination signal, and judging whether the received voice call origination signal contains a preset Public Land Mobile Network (PLMN) service identification number;
  judging whether current Public Switched Telephone Network link status is normal, when the voice call origination signal does not contain the Public Land Mobile Network service identification number; and
  forwarding the voice call origination signal to the Public Switched Telephone Network, when the Public Switched Telephone Network link status is normal; and
  routing the received voice call origination signal to the Public Land Mobile Network, when either the voice call origination signal contains the Public Land Mobile Network service identification number, the Public Switched Telephone Network link status is considered to be not normal, or the mobile terminal is not verified.

10. The call processing method according to claim 9, further comprising the steps of:
  when the received origination signal is a data call origination signal, making a verification of the mobile terminal and after the verification, judging whether the link status of the Internet is considered to be normal; and
  when the Internet link status is considered to be normal, forwarding the received data call origination signal to the Internet.

11. The call processing method according to claim 10, further comprising a step of:
  routing the received data call origination signal to the Public Land Mobile Network, when the Internet link status is not normal or the mobile terminal is not verified.

12. A call processing method in a private wireless communication system, the method comprising steps of:
  judging whether a received voice call connection request message contains a preset Public Land Mobile Network (PLMN) service identification number, when a voice call connection request message is received from a mobile terminal;
  inspecting whether a link status of a linked Public Switched Telephone Network (PSTN) is considered to be normal, when a determination is made that the voice call connection request message does not contain the preset Public Land Mobile Network service identification number; and
  forwarding the received voice call connection request message to the linked Public Switched Telephone Network, when it is judged that the link status is considered to be normal.

13. The call processing method according to claim 12, further comprising a step of:
  when the voice call connection request message does not contain the Public Land Mobile Network service identification number, executing a subscription verification to the mobile terminal; and
  when either the mobile terminal is not verified or the current Public Switched Telephone Network link status is considered to be not normal, routing the received voice call connection request message to the Public Land Mobile Network.

14. A call processing method in a private wireless communication system, the method comprising steps of:
  executing a subscription verification of a mobile terminal with the private wireless communication system, when a data call request message is received from the mobile terminal;
  when the subscription of mobile terminal is verified, making a determination of whether or not a link status of a linked Internet is considered to be normal; and
  when the Internet link status is normal, forwarding the received data call connection request message to the linked Internet; and
  routing the received data call connection request message to a Public Land Mobile Network, when either the subscription of mobile terminal is not verified or the Internet link status is considered to be not normal.

15. A call processing method in a private wireless communication system, the method comprising steps of:

when a call connection request message is received from a mobile terminal, judging whether the received call connection request message contains preset identification information for a Public Land Mobile Network (PLMN) service;

when the call connection request message does not contain the Public Land Mobile Network service identification information, judging whether the received call connection request message is one of a voice call connection request message and a data call connection request message;

verifying whether the mobile terminal is subscribed to the private wireless communication system;

forwarding the call connection request signal to a linked Public Switched Telephone Network (PSTN), when a first determination is made that the mobile terminal is subscribed to the private wireless communication system and a second determination is made that the received call connection request message is a voice call connection request message; and forwarding the call connection request signal to a linked Internet, when a third determination is made that the mobile terminal is subscribed to the private wireless communication system and the received call connection request message is a data call connection request message.

* * * * *

UNITED STATES PATENT AND TRADEMARK OFFICE
CERTIFICATE OF CORRECTION

PATENT NO. : 7,613,459 B2  Page 1 of 1
APPLICATION NO. : 11/216036
DATED : November 3, 2009
INVENTOR(S) : Woo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 619 days.

Signed and Sealed this

Fourteenth Day of December, 2010

David J. Kappos
*Director of the United States Patent and Trademark Office*